United States Patent [19]

Seibert et al.

[11] Patent Number: 4,796,959
[45] Date of Patent: Jan. 10, 1989

[54] BRAKE SYSTEM WITH CONTROL OF BRAKE SLIP AND TRACTION SLIP

[75] Inventors: Wolfram Seibert, Pfungstadt; Norbert Ocvirk; Guenther Trach, both of Offenbach; Joachim Maas, Darmstadt, all of Fed. Rep. of Germany

[73] Assignee: Alfred Teves GmbH, Frankfurt am Main, Fed. Rep. of Germany

[21] Appl. No.: 71,960

[22] Filed: Jul. 10, 1987

[30] Foreign Application Priority Data

Jul. 10, 1986 [DE] Fed. Rep. of Germany ....... 3623150

[51] Int. Cl.$^4$ .......................... B60T 8/36; B60T 8/64; B60T 8/34
[52] U.S. Cl. .................................. 303/119; 303/110; 303/114; 180/197
[58] Field of Search ................... 180/197; 188/181 A; 303/100, 110, 111, 113, 114, 116, 119

[56] References Cited

U.S. PATENT DOCUMENTS

| | | | |
|---|---|---|---|
| 4,416,347 | 11/1983 | Bertling et al. | 303/110 X |
| 4,484,280 | 11/1984 | Brugger et al. | 180/197 X |
| 4,589,706 | 5/1986 | Leiber | 303/119 X |
| 4,715,663 | 12/1987 | Hattori et al. | 303/116 X |

FOREIGN PATENT DOCUMENTS

| | | | |
|---|---|---|---|
| 0016161 | 1/1986 | Japan | 303/111 |
| 2119883 | 11/1983 | United Kingdom | 303/119 |
| 2155129 | 9/1985 | United Kingdom | 303/114 |
| 2178499 | 2/1987 | United Kingdom | 303/116 |

Primary Examiner—Andres Kashnikow
Assistant Examiner—Timothy Newholm
Attorney, Agent, or Firm—James B. Raden

[57] ABSTRACT

A brake system provided for automotive vehicles with front wheel drive or with rear wheel drive has a dual-circuit braking pressure generator (1) and diagonally connected wheel brakes. There is provided an auxiliary-pressure-supply system (5) with a hydraulic pump (6) which is switched on during brake application or when there is an excessive traction slip. In the brake slip control phase an auxiliary pressure is built up by an auxiliary pressure control valve (9), in the traction slip control phase an auxiliary pressure is built up by a 2/2-way valve (10). By separating valves (15, 16) the pressure medium path to the non-driven vehicle wheel (HR, HL) is locked in the traction slip control phase and, via inlet valves (EV$_3$, EV$_4$), pressure medium is directly fed from the auxiliary-pressure-supply system (5) into the driven wheels (VL, VR). Connected in parallel with the inlet valves (EV$_1$, EV$_2$) connecting the braking pressure generator (1) with the wheel brakes (17–20) is one non-return valve (13, 14) each of which can open toward the braking pressure generator (1).

8 Claims, 2 Drawing Sheets

BRAKE SYSTEM WITH CONTROL OF BRAKE SLIP AND TRACTION SLIP

BACKGROUND OF THE INVENTION

This invention relates to a brake system for automotive vehicles with front wheel drive or rear wheel drive and, in particular, to such a system with brake slip and traction slip control. One such brake system includes an auxiliary-energy-assisted braking pressure generator, two hydraulically separated pressure medium circuits arranged so that one front wheel and one rear wheel are connected and so that the allocation is preferably diagonal, and a hydraulic auxiliary-pressure-supply system. Valve arrangements are inserted into the pressure medium paths leading from the braking pressure generator and from the auxiliary-pressure-supply system to the wheel brakes and from the wheel brakes to a pressure compensation reservoir. These valve arrangements hydraulically connect the braking pressure generator with the wheel brakes in one switching position and the auxiliary-pressure-supply system with the wheel brakes in a second switching position. Separating valves are also included which, in the traction slip control phase, lock the pressure medium connection toward the wheel brake of the non-driven vehicle wheels. Finally, wheel sensors and electronic circuits are included for the determination of the rotational behavior of the wheels and for the generation of electric braking pressure control signals by means of which the valve arrangements and the separating valves can be changed over.

There are already known lock-up-protected brake systems equipped with an auxiliary-pressure-supply system by means of which braking pressure is also metered into the driven vehicle wheels for the purpose of controlling the starting slip or rather the traction slip (German Published Patent Applications DE-OS Nos. 33 38 826 and 34 07 538). As compared with a mere lock-up control system which only controls the brake slip the extra expenditure in these known systems is relatively small because a large number of components required for lock-up control can also be used for the detection and braking of the wheels spinning in case of excessive traction energy. What is also required for starting slip control are the auxiliary-pressure-supply system, the sensors for detecting the rotational behavior of the wheels, the electronic circuits for processing the sensor signals and for generating the braking pressure control signals and some of the slip-controlling valves. The electronics, of course, must be expanded, but this can be done at relatively small expense. For the purpose of starting slip control, the known lock-up-protected brake systems also include a few additional valves by means of which braking pressure is fed from the auxiliary-pressure-supply system into the wheel brakes of the driven wheels without actuation of the braking pressure generator.

There has already been suggested a brake-slip-and-traction-slip-controlled dual-circuit brake system of the type mentioned above for vehicles with diagonal brake circuit allocation (German Published Patent Application No. P 35 27 190). Inserted into the pressure medium paths from the inlet valves to the wheel brakes of the non-driven wheels of this known system are separating valves operative to ensure that only the driven wheels are braked in the traction slip control phase after the switching-off of the auxiliary-pressure-supply system. In this known system it is not possible to connect any non-return valves opening toward the braking pressure generator in parallel with the inlet valves connecting the braking pressure generator with the wheel brakes as in the traction slip control phase in which the brake pedal is not operated. Thus, the master cylinder or rather the braking pressure generator remain unpressurized and said non-return valves would prevent a pressure build-up in the wheel brakes of the driven wheels. However, for lock-up control and for safety reasons such non-return valves are desirable.

SUMMARY OF THE INVENTION

It is thus an object of this invention to provide a valve arrangement or hydraulic circuitry for dual-circuit brake-slip-and-traction-slip-controlling brake systems with diagonal brake circuit allocation which can be realized at small expense. It is also an object of this invention to provide such a valve arrangement or circuitry which permits the parallel connection of non-return valves in respect of the inlet valves which connect the braking pressure generator with the wheel brakes and by means of which, upon release of the brake or rather upon reduction of the pedal force, it is possible to reduce the braking pressure during an uncontrolled or during a brake-slip-controlled braking action.

It now has been found that those objects can be provided in a surprisingly simple manner in a brake system of the type mentioned above in that the separating valves in each diagonal brake circuit are multi-directional valves which normally are open for passage and which connect the two wheel brakes of one hydraulic brake circuit and which are inserted between an inlet valve or inlet valve branch (the branch that connects the braking pressure generator with the wheel brakes) and the wheel brake of the driven vehicle wheel. The multi-directional valves can be changed over to lock or to reduce pressure, the auxiliary-pressure-supply system being directly connectible to the wheel brakes of the driven wheels.

By means of the suggested design and arrangement of the separating valves and of the inlet valves, it is thus possible to connect a non-return valve in parallel with the inlet valve which controls the pressure medium supply from the braking pressure generator to the wheel brakes without any additional expense as compared to prior art systems. This is of advantage for brake slip control rating. Further, it is ensured that a pressure reduction is possible via the braking pressure generator even in case of a jamming inlet valve. Traction slip control will not be impaired as in this phase of control the changed-over separating valve will prevent a pressure medium drain via the braking pressure generator and a pressurization of the non-driven wheel.

According to an advantageous embodiment of this invention 2/2-way valves are provided as separating valves. These valves are open for passage in the rest position.

Further, it is advantageous for some embodiments of the brake system to design the valves that connect the wheel brakes with the pressure compensation reservoir, as normally locking 2/2-way valves. One of said valves at a time is connected directly to the wheel brake of one driven wheel.

According to a further embodiment of this invention both the valve arrangements and the separating valves are designed as electromagnetically switch-over multi-directional valves.

Finally, one embodiment of this invention also provides that the auxiliary-pressure-supply system has an electric-motor driven hydraulic pump. In the pressure medium circuit from the delivery side toward the suction side there is provided a pressure control valve controllable by the pressure in the braking pressure generator upon actuation of the brake and there is also provided, in series, a multi-directional valve which can be changed over electromagnetically to lock in the traction slip control phase.

According to one embodiment of this invention both the inlet valves, via which the auxiliary-pressure-supply system is connected to the wheel brake, and the outlet valves, establishing a hydraulic communication toward the pressure compensation reservoir in the pressure build-up phase, are designed as 2/2-way valves. Instead of these inlet/outlet valve pairs, however, it is also possible to use a 3/2-way valve per brake circuit which, in its rest position, establishes a communication between the wheel brakes of the driven wheels and the auxiliary-pressure-supply system and which, after changing over, establishes a communication between these wheels and the pressure compensation reservoir. This alternative results in a simplification and cost reduction. In the pressure retaining phase during brake slip control it is possible to achieve a pressure, whose average value is constant, by means of switching the valves to and fro.

BRIEF DESCRIPTION OF THE DRAWING

Further characteristics, advantages, and applications of this invention will become evident from the following description of preferred embodiments shown in the figures of the accompanying drawing, in which.

DETAILED DESCRIPTION OF PREFERRED EMBODIMENTS

Figure 1:
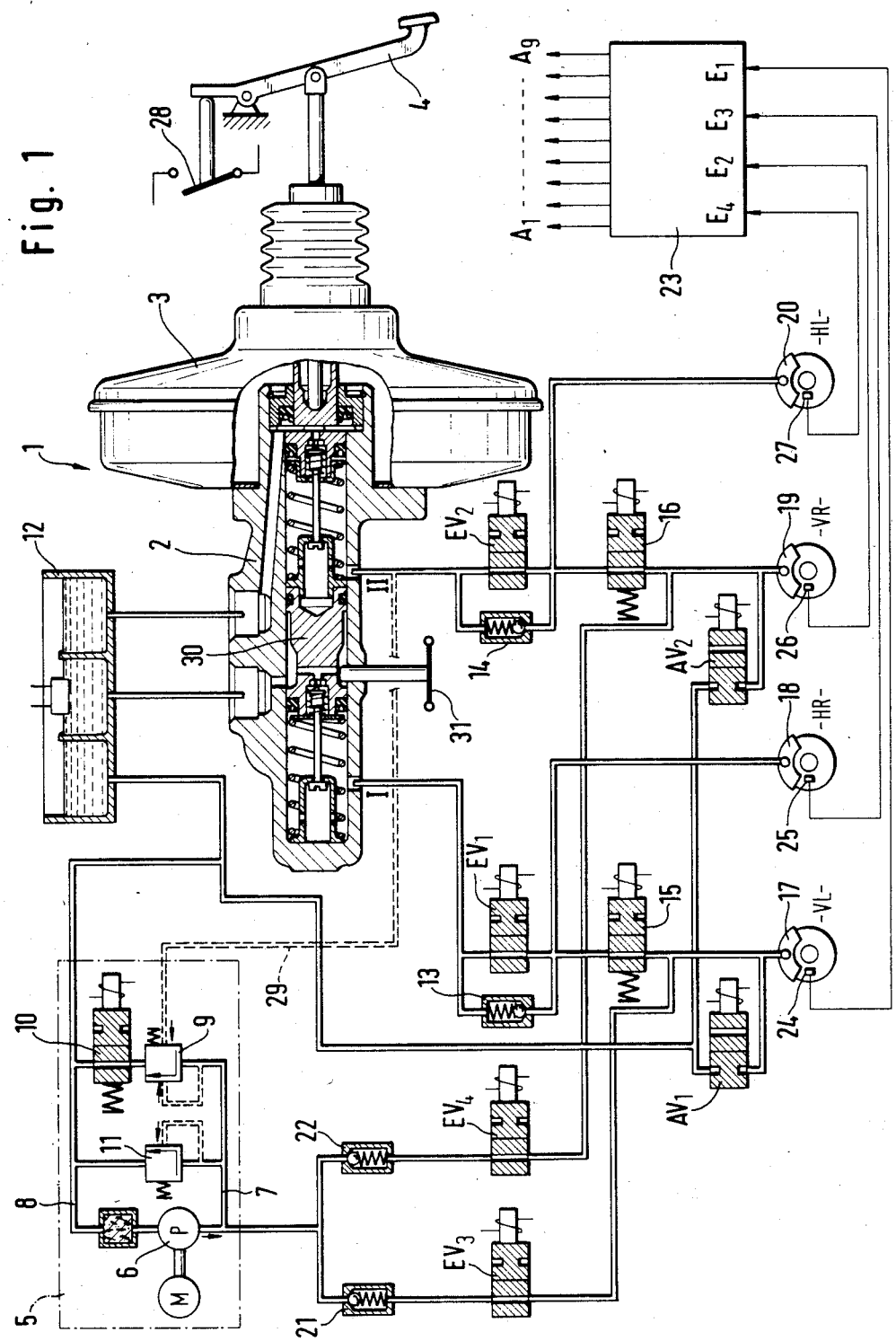
FIG. 1 is a simplified, practically schematic representation of the basic components of a brake system in accordance with this invention.

According to an embodiment of this invention illustrated in FIG. 1, the brake system has a braking pressure generator 1 which essentially comprises a tandem master cylinder 2 and a vacuum brake booster 3 connected upstream. The braking pressure generator 1 is actuated by a brake pedal 4.

The basic components of an auxiliary-pressure-supply system 5 are an electric-motor-driven hydraulic pump 6 whose delivery side is connected with its suction side via a pressure medium circuit including the pressure medium lines 7 and 8, a pressure control valve 9 and an electromagnetically controlled switch-over 2/2-way valve 10. The valves 9 and 10 are inserted in series into said pressure medium circuit. A pressure relief valve 11 is also provided. Connected to a common pressure compensation reservoir 12 are the master cylinder 2 and the suction side of the hydraulic pump 6.

In the embodiment disclosed in FIG. 1 the automotive vehicle is provided with front wheel drive. Two brake circuits I, II each lead to the wheel brakes of one diagonal; namely, brake circuit I leads to the left front wheel VL and to the right real wheel HR and brake circuit II leads to the other two wheels VR, HL.

Inserted into each of the pressure medium paths connecting the master cylinder with the wheel brakes is an inlet valve $EV_1$, $EV_2$, respectively. The valves $EV_1$ and $EV_2$ are open for passage in the rest position. One non-return valve 13, 14 is connected in parallel with valves $EV_1$, $EV_2$, respectively. Directly connected to the outlets of the inlet valves $EV_1$, $EV_2$ are the non-driven wheels, in this example: the rear wheels HR and HL. A 2/2-way valve 15, 16 is provided in each of the pressure medium paths leading to the driven wheels. In the rest positions the valves 15 and 16 are likewise open for passage and serve as separating valves for traction slip control.

Further, an outlet valve $AV_1$, $AV_2$ is connected to each wheel brake 17 and 19, respectively, of the driven wheels. The outlet valves $AV_1$, $AV_2$ normally lock the pressure medium passage and can be changed over to open for passage for the purpose of pressure reduction during the control phase. Then pressure medium will flow off from the wheel brakes 17, 19 to the pressure compensation reservoir 12 and also from the wheel brakes 18, 20 through the separating valves 15, 16 to the reservoir 12.

Finally, two further inlet valves $EV_3$, $EV_4$ are provided which establish a hydraulic communication between the auxiliary-pressure-supply system 5 and the wheel brakes 17, 19 in a direct manner and with the wheel brakes 18, 20 via the separating valves 15, 16. In series with said inlet valves $EV_3$, $EV_4$ there are connected non-return valves 21, 22 serving to uncouple the hydraulic circuits and preventing pressure medium from flowing off when the auxiliary-pressure-supply system 5 is unpressurized.

All described valves are designed as electromagnetically operable 2/2-way valves and are connected to the outputs $A_1$–$A_9$ of an electronic control unit 23 via non-illustrated signal lines. The inputs $E_1$–$E_4$ of said control unit 23 are connected to wheel sensors 24–27, e.g., inductive transducers, via signal lines. The information on the rotational behavior of the individual wheels and a vehicular velocity reference value which can be derived therefrom are obtained by means of the sensors 24–27 and are transformed by signal processing into braking pressure control signals which, via the control unit's outputs $A_1$–$A_9$, define the switching positions of the illustrated 2/2-way valves $EV_1$–$EV_4$, $AV_1$, $AV_2$, 10, 15, 16.

The illustrated brake system works as follows:

In case of uncontrolled braking operations initiated by the application of the brake pedal 4, all electromagnetically operable multi-directional valves of FIG. 1 maintain their illustrated positions. The pressure medium paths via the brake circuits I, II from the tandem master cylinder 2 to the wheel brakes 17–20 are open and the pressure medium return flow toward the reservoir 12 are locked. Via a switch 28, e.g., the stop-light switch, the motor M or the hydraulic pump 6 is switched on upon any pedal application and the auxiliary pressure control valve 9 is pressurized by the braking pressure, generated in the master cylinder, via the hydraulic connection line 29 illustrated by a broken line. In this case, the control valve 9 is connected to brake circuit II. Thus, an auxiliary pressure is generated in the auxiliary-pressure-supply system 5, and this by a throttle within the auxiliary pressure control valve 9. The auxiliary pressure is proportional to the pressure in brake circuit II and acts on the delivery side of the hydraulic pump 6 as well as on the wheel brakes 17–20 via the non-return valves 21, 22 and the open-passage multi-directional valves $EV_3$, $EV_4$.

A travel-responsive switch 31, actuated by an inclined ramp on the intermediate piston 30 in the master cylinder 2, is used to gain information on the travel of the piston 30. This information can be evaluated in the control unit 23. This is not of interest in connection with the present invention and will not be further described.

For brake slip control, it is possible, in a known manner, to keep the braking pressure constant by changing-over of the inlet valves $EV_1$, $EV_2$ and that the braking pressure in the wheel brakes 17-20 is reduced by means of changing-over of the outlet valves $AV_1$, $AV_2$—in conjunction with locked inlet valves $EV_1$-$EV_4$.

For controlling the starting slip or rather for traction slip control, additionally, the separating valves 15, 16 are required. After changing-over of said valves the wheel brakes 18, 20 of the non-driven wheels will remain unpressurized even when, after switching-on of the hydraulic pump 6 and after changing-over of the 2/2-way valve 10, an auxiliary pressure is generated in the pressure medium circuit of the auxiliary-pressure-supply system 5 and is supplied to the wheel brake 17 or 19, respectively, of the spinning driven wheel VL or VR via the valves 21, $EV_3$ or 22, $EV_4$. By means of short-time or pulse-wise actuation of the inlet valves $EV_3$, $EV_4$ the braking pressure is dosed by the electronic control unit 23 in dependence on the rotational behavior of the wheel.

During traction slip control, also—via the outlet valves $AV_1$, $AV_2$—it is possible to again reduce the braking pressure completely or to reduce it down to the optimum pressure level depending on the rotational wheel behavior without the separating valves 15, 16 being switched back.

Figure 2:
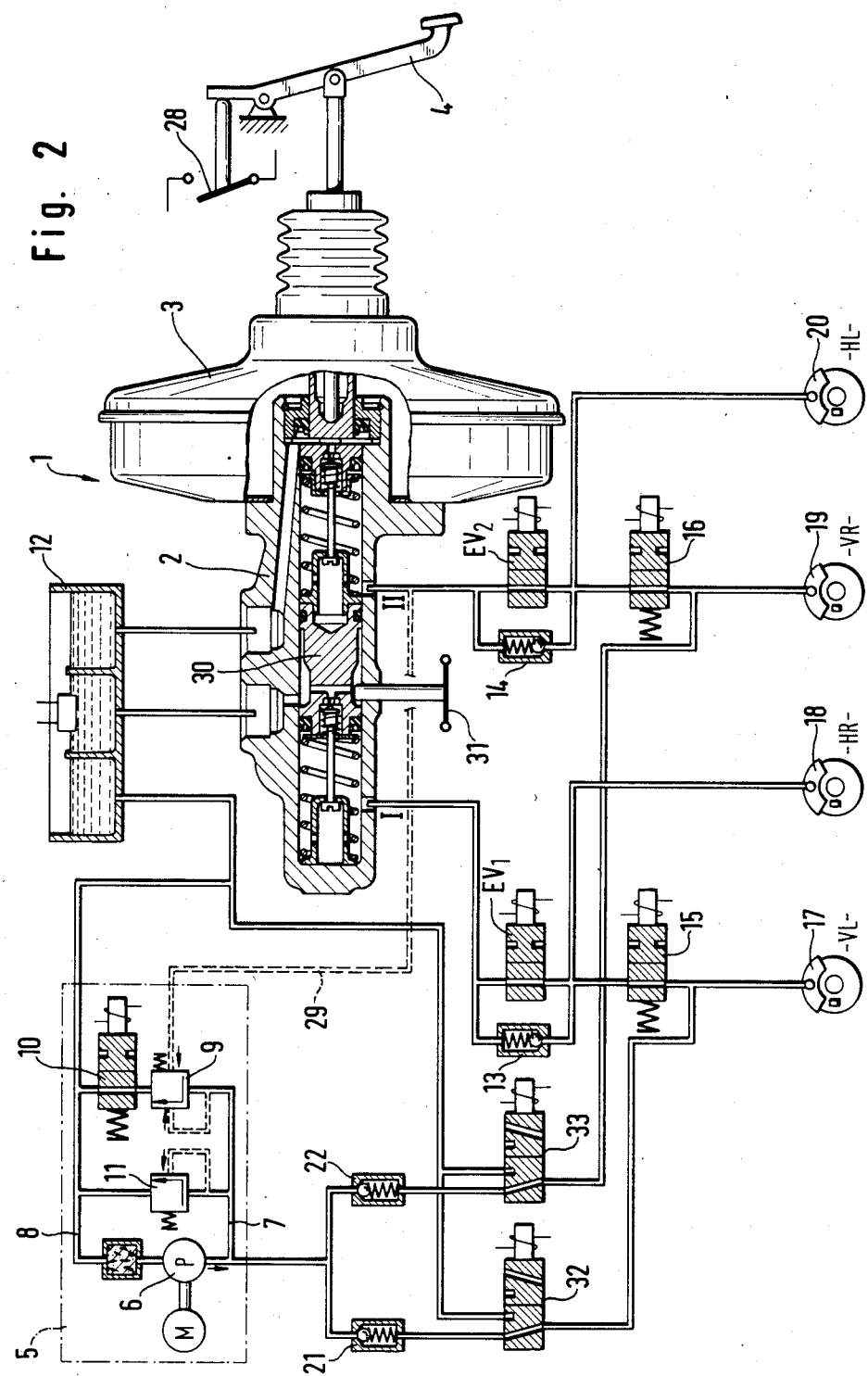
FIG. 2 is a variation of the embodiment of FIG. 1.

The brake system according to FIG. 2 differs from the example of an embodiment described with reference to FIG. 1 only by the use of 3/2-way valves 32, 33 instead of the inlet valves $EV_3$, $EV_4$ which establish the communication between the wheel brakes 17, 19 of the driven wheels VL, VR and the auxiliary-pressure-supply system 5. And, instead of the outlet valves $AV_1$, $AV_2$ required for the pressure reduction, especially during brake slip control. In their rest positions the valves 32, 33 establish a communication between the wheel brakes and the auxiliary-pressure-supply system 5 via the non-return valves 21, 22 while, after changing over, the braking pressure is removed toward the pressure compensation reservoir 12 via the valves 32, 33. In the pressure retaining phase, while the average braking pressure is kept constant in the wheel brakes, the valves 32, 33 are permanently switched to and fro. Thereby, it is possible to establish a pressure in the wheel brakes whose average value is constant. No further differences between the examples of embodiments according to FIGS. 1 and 2 require any explanation.

What is claimed is:

1. A brake system for automotive vehicles with control of brake slip and traction slip, said system comprising an auxiliary-energy-assisted braking pressure generator, two hydraulically separated pressure medium circuits each of which connects one driven wheel and one non-driven wheel with said pressure generator, valve arrangements in pressure medium paths leading from the braking pressure generator and from an auxiliary-pressure-supply system to the wheel brakes and from the wheel brakes to a pressure compensation reservoir, said valve arrangements hydraulically connecting the braking pressure generator with the wheel brakes in one switching position and hydraulically connecting the auxiliary-pressure-supply system instead of the braking pressure generator with the wheel brakes in a second switching position, two separating valves each of which is located in one of said pressure medium circuits between an inlet valve of said valve arrangement and the wheel brakes of the respective pressure medium circuit, and each of which is operative in the traction slip control phase to lock the pressure medium connection to the wheel brakes of the non-driven vehicle wheels from the auxiliary-pressure-supply system, wheel sensors and electronic circuits for the determination of the rotational behavior of the wheels and for the generation of electric braking pressure control signals by means of which the valve arrangements and the separating valves can be changed over, the separating valves in each brake circuit each comprising a multi-directional valve which is normally open for passage and which connects the two wheel brakes of one brake circuit, said valve arrangements further comprising additional multi-directional valves between the auxiliary-pressure-supply system and the wheel brakes of the driven wheels, said additional multi-directional valves having a first position connecting the auxiliary pressure system and the wheel brakes of the driven wheels and a second position to modify brake pressure and wherein the auxiliary pressure provided by said auxiliary-pressure-supply system is introduced into the braking circuit between aid separating valves and the wheel brakes of the respective driven wheels.

2. A brake system as claimed in claim 1, wherein the separating valves are 2/2-way valves which are open for passage in the rest position.

3. A brake system as claimed in claim 1, wherein the valve arrangements include valves that connect the wheel brakes with the pressure compensation reservoir, these valves being normally locking 2/2-way valves which are changed over into a position open for passage, each of said valves respectively being directly connected to the wheel brake of one driven wheel.

4. A brake system as claimed in claim 1 wherein one non-return valve opening toward the braking pressure generator is connected in parallel with each inlet valve connecting the braking pressure generator with the wheel brakes.

5. A brake system as claimed in claim 1 wherein the valve arrangements and the separating valves comprise electromagnetically controlled multi-directional valves.

6. A brake system as claimed in claim 1 wherein each of said additional multi-directional contract valves comprise a 2/2-way valve open for passage in the rest position and by a 2/2-way valve locked in the rest position.

7. A brake system as claimed in claim 1 wherein each of said additional multi-directional control valves comprise a 3/2-way valve which in the rest position establishes the communication from the wheel brake of the associated driven wheel toward the auxiliary-pressure-system and which, after changing over, establishes the communication from the wheel brake of the associated driven wheel toward the pressure compensation reservoir.

8. A brake system as claimed in claim 1 wherein the auxiliary-pressure-supply system has an electric-motor-driven hydraulic pump and a pressure control valve and a multi-directional valve in series between the delivery side and the suction side of said pump, said pressure control valve being controllable by the pressure in the braking pressure generator upon the actuation of the brake, said multi-directional valve being electromagnetically controlled to lock in the traction slip control phase.

* * * * *